C. N. HATFIELD.
GRAIN AND SEED CLEANER, SEPARATOR, AND GRADER.
APPLICATION FILED JUNE 16, 1913.

1,087,765.

Patented Feb. 17, 1914.

2 SHEETS—SHEET 1.

Witnesses
Stuart Hilder
Francis W. Anderson

Inventor
Charles N. Hatfield.
By
E. W. Anderson & Son
his Attorneys

C. N. HATFIELD.
GRAIN AND SEED CLEANER, SEPARATOR, AND GRADER.
APPLICATION FILED JUNE 16, 1913.
1,087,765.
Patented Feb. 17, 1914.
2 SHEETS—SHEET 2.
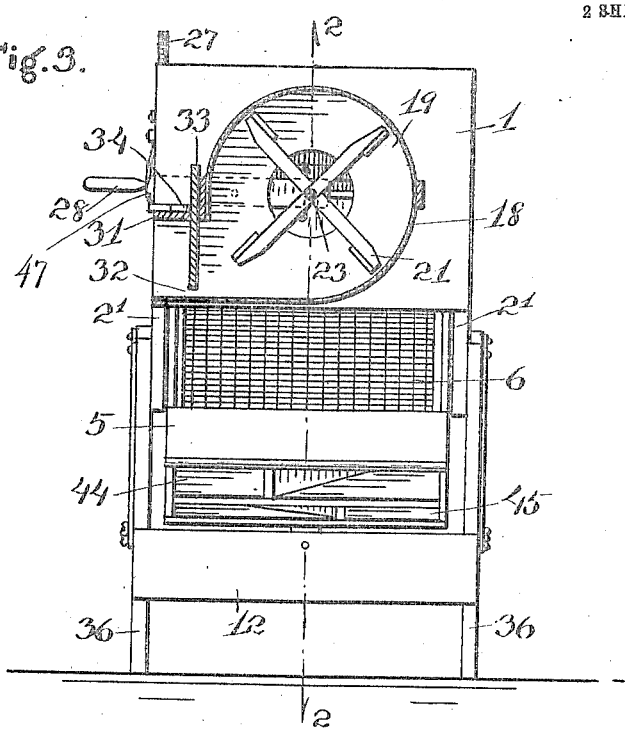
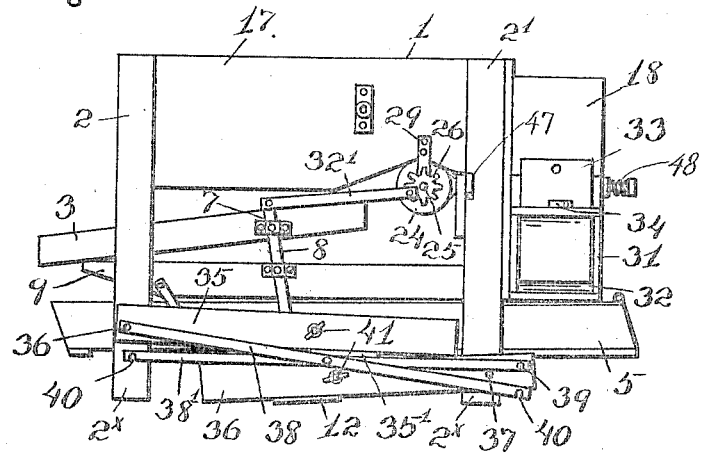

UNITED STATES PATENT OFFICE.

CHARLES N. HATFIELD, OF FOUNTAIN CITY, INDIANA.

GRAIN AND SEED CLEANER, SEPARATOR, AND GRADER.

1,087,765.  Specification of Letters Patent.  Patented Feb. 17, 1914.

Application filed June 16, 1913. Serial No. 773,911.

*To all whom it may concern:*

Be it known that I, CHARLES N. HATFIELD, a citizen of the United States, resident of Fountain City, in the county of Wayne and State of Indiana, have made a certain new and useful Invention in Grain and Seed Cleaners, Separators, and Graders; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
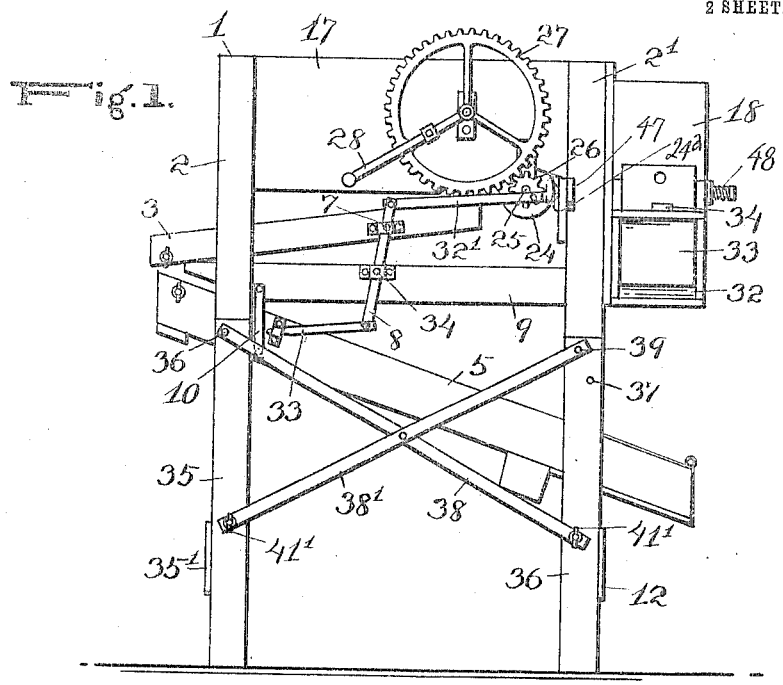
Figure 2:
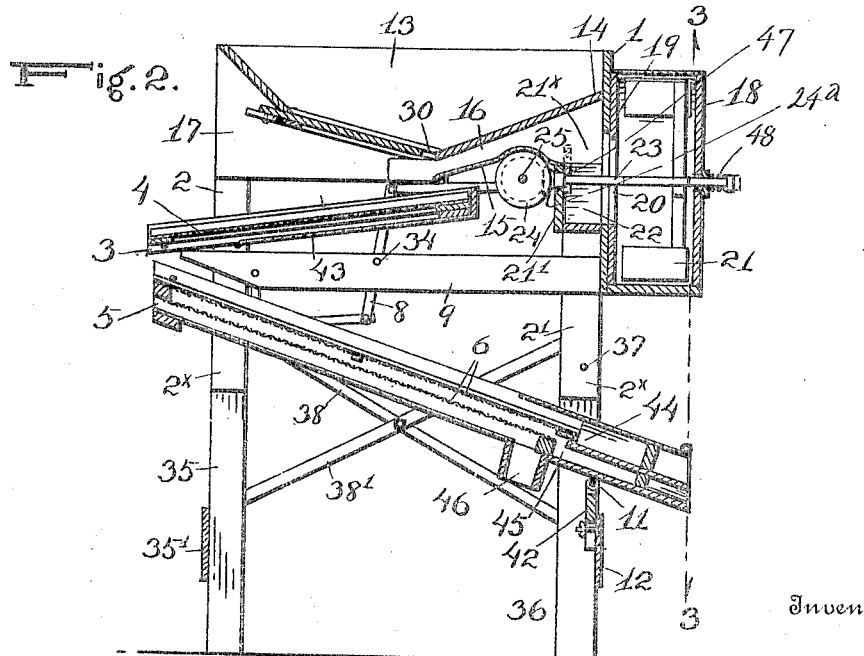

Figure 1 is a side view of the machine. Fig. 2 is a section on the line 2—2, Fig. 3. Fig. 3 is a section on the line 3—3, Fig. 2. Fig. 4 is a side view of the machine with the crank gear removed and the legs and shoes folded.

The invention has relation to grain and seed cleaners separators and graders, and it consists in the novel construction and combinations of parts, as hereinafter set forth.

In the accompanying drawings illustrating the invention, the numeral 1 designates the supporting frame having uprights 2, 2', at each side; 3, is the upper shoe, carrying the screen 4; and 5, is the lower shoe, carrying the screens 6. The upper shoe is shorter than the lower shoe and is pivoted at its rear end portion at 7 to the vibratory bars 8, 8, from which it has support, said shoe at its forward end resting upon the side frame bars 9, 9, connecting the uprights at each side. The lower shoe is hung at its forward end from links 10, 10, pivoted at their upper ends to the side bars 9, the shoe being supported and having sliding movement at its rear end upon an anti-friction roller 11, carried by the transverse brace 12.

The hopper is shown at 13, and discharges upon the upper screen, said hopper having a rear inclined bottom board 14, of an inclination similar to that of the upper shoe, which at its rear end portion laps under the forward end portion of the board 14, there being an interval of separation wherein is located an inclined board or plate 15, said plate forming the bottom of a suction draft passage 16, of which the bottom board 14 forms the top, and the lateral boards 17 of the hopper form the sides.

At the rear end of the machine is located a cylindrical fan casing 18 having plane end walls parallel to the ends of the machine, the inner of these end walls 19, being the end wall of the hopper box, and having a central opening 20, leading to the fan 21 in the fan casing, an upward extending passage 21$^x$ connecting said central opening and the draft passage, the passage 21$^x$ having inclined converging bottom walls 22, to concentrate the draft through the passage 16 to the central opening into the fan casing. The fan shaft 23, has projection at one end portion through the passage 21$^x$ and through the inner end wall 21' of said passage, where it is provided with a bevel gear connection 24, with a transversely extending rotary shaft 25, the latter shaft carrying usually a pinion 26, engaged by a large spur gear wheel 27, operated by a crank 28. The transverse shaft is usually hung in depending brackets 29 of the hopper side boards.

The fan is operated to produce a suction in the draft passage 16, opening at its forward end immediately below the hopper discharge 30, having the effect of sucking the chaff or impurities of the grain or seed into the passage 16 and therefrom into the fan casing from which these impurities are discharged laterally of the machine and tangentially of the fan casing through the discharge extension 31 of the fan casing, the discharge opening 32 of this extension being controlled by an adjustable board 33, to regulate the size of the discharge opening, suitable means 34 being provided to fix the adjustment. The pinion 26, is provided in duplicate at the ends of the shaft, and each pinion has a connecting rod 32' with the upper ends of the vibratory bars 8, at each side, said bars 8, 8, having at their lower ends operating rod connections 33, with the lower shoe, the bars 8, 8, being each pivoted intermediately of its length to the frame of the machine at 34. Upon operation of the spur gear by its crank, the fan will be rotated at high speed, without too rapid reciprocation of the upper and lower shoes.

The fan casing and fan are comparatively of small dimensions taking up but little space at the end of the machine, but being rapidly rotated will effectually suck the impurities or chaff from the seed or grain, any of the heavier seed or grain that may be at first carried into the draft passage rolling back again along the inclined bottom of said passage to the screen below. In this way the screens are relieved from taking care of the impurities and chaff and are enabled to do their work better and more rapidly.

In folding for transportation or storage, the machine is reversed or placed upside down, when the lower shoe (now uppermost) will drop at its rear end upon its forward pivots until it rests in approximately horizontal position upon the hopper box end board. The lateral uprights 2, 2', of the frame will then project above this lower shoe, being of suitable length for this purpose. One pair of the opposite legs 35, normally in alinement and forming extensions of the uprights 2, are pivoted at their upper ends at 36 to said uprights 2 above the extensions 2ˣ of the uprights, so that when these legs in the reversed position of the machine are turned downward upon their pivots they will assume approximately horizontal position at each side of the lower shoe, with the transverse brace 35' connecting the legs resting upon the lower shoe. The other pair of opposite legs 36, also normally in alinement and forming extensions of the uprights 2', are pivoted at 37 to the projecting portions 2ˣ of the uprights below the pivots 36 of the other pair of legs, so that this second pair of legs will fold downwardly upon the first pair of legs.

Cross braces 38, 38' are provided at each side of the machine, connecting the legs at each side, the upper ends of the brace bars 38 of each pair being pivoted preferably upon the leg pivots, and the upper ends of the brace bars 38' of each pair being pivoted to the legs at 39 in horizontal alinement with the pivots of the other bars 38, but above the leg pivots at this end of the machine, so that when the upper pair of legs is raised or unfolded (the machine being upside down) the cross braces will be automatically raised or unfolded at the same time. The other or lower pair of legs is then raised or unfolded, and the notched seats 40 of the lower ends of the bars 38, 38' engaged with the bolts 41 of the legs, the thumb nuts 41' being then turned home to secure the cross braces in position and brace the legs in alinement with the uprights. The upper shoe hung pivotally at the rear end and sliding at its forward end upon the side bars of the frame will allow the heavier material that the suction draft may not have removed to drift or fall off forwardly. The lower shoe has a lifting movement at its forward end in the reciprocating movement of the shoe, which will keep the screens of the shoe from clogging. The antifriction roller at the lower end of the lower shoe has support in the upright 42, which may be adjusted vertically to vary the inclination of the shoe as may be required.

The screens of the shoes may be removed and replaced by others as may be required. The grain is discharged through the upper screen to the grain board 43, said board delivering to the upper screen of the lower shoe which discharges at one side at 44, the lower screen of the lower shoe discharging at the other side at 45, the material passing through the lower screen of the lower shoe discharging through the spout 46 at the bottom.

It is preferred that means be provided to throw the fan in and out of gear when desired, this means consisting usually of an endwise movable fan shaft, a lever 47 normally engaging behind the gear 24ᵃ to hold it in mesh with the gear 24. When the lever 47 is operated for release or raised, the fan shaft and gear 24ᵃ will move endwise under the influence of the spring 48 and the gears will no longer be in engagement.

What I claim is:—

1. A grain and seed cleaner separator and grader, having a hopper, a draft passage extending upwardly from and having its lower end located immediately below and adjacent to the mouth of said hopper, the lower wall of said passage having an upward projecting shoulder to cause the return of the heavier grain, a suction fan having a casing communicating with the upper end of said draft passage, and a vibratory screen located below said draft passage.

2. A grain and seed cleaner separator and grader, having a hopper, upper and lower vibratory oppositely inclined shoes carrying screens, a fan, and a fan casing having its lower wall located about on a level with the upper end of the lower of said shoes, the space between said shoes being normally open and unobstructed for convenient inspection and repairing, and the lower of said shoes being foldable upwardly into approximately horizontal position close to said fan casing.

3. In a grain and seed cleaner separator and grader, a supporting frame having uprights at each side, a lower shoe hung at its upper end within the uprights and capable of folding at its lower end within the uprights into approximately horizontal position, legs pivoted at their upper ends at different levels to and normally in alinement with said uprights, said legs being foldable into approximately horizontal position at different levels, and cross braces for the legs at each side automatically foldable and unfoldable with said legs.

"In testimony whereof I affix my signature, in presence of two witnesses.

CHARLES N. HATFIELD.

Witnesses.
Thomas Brennan,
T. J. Bloom.